(12) United States Patent
Murphy et al.

(10) Patent No.: US 8,523,240 B2
(45) Date of Patent: Sep. 3, 2013

(54) FERRULE

(75) Inventors: Richard M. Murphy, East Hampton, CT (US); Billie W. Bunting, Colchester, CT (US); Fungayi Mutsengi, Bloomfield, CT (US); David W. Anderson, South Windsor, CT (US); Robert J. DeRosa, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/323,972

(22) Filed: Dec. 13, 2011

(65) Prior Publication Data

US 2013/0147182 A1    Jun. 13, 2013

(51) Int. Cl.
*F16L 25/00*    (2006.01)

(52) U.S. Cl.
USPC .............................. 285/92; 285/89; 285/386

(58) Field of Classification Search
USPC .................... 285/92, 89, 386, 354; 29/890.14
See application file for complete search history.

(56) References Cited

U.S. PATENT DOCUMENTS

| | | | |
|---|---|---|---|
| 2,390,103 A * | 12/1945 | Johnson | 285/89 |
| 2,491,406 A * | 12/1949 | Zeeb | 285/89 |
| 3,390,900 A * | 7/1968 | McCormick et al. | 285/89 |
| 3,971,614 A * | 7/1976 | Paoli et al. | 285/89 |
| 4,295,666 A | 10/1981 | Melanson | |
| 4,422,675 A | 12/1983 | Norris et al. | |
| 4,927,187 A | 5/1990 | Sanford et al. | |
| 5,156,421 A * | 10/1992 | Chauvel | 285/92 |
| 5,215,336 A | 6/1993 | Worthing | |
| 5,372,393 A * | 12/1994 | Austin | 285/354 |
| 5,474,473 A | 12/1995 | Perretta et al. | |
| 5,823,702 A | 10/1998 | Bynum | |
| 5,882,044 A * | 3/1999 | Sloane | 285/92 |
| 6,557,900 B1 * | 5/2003 | Austin | 285/92 |
| 6,857,665 B2 | 2/2005 | Vyse et al. | |
| 7,156,424 B2 | 1/2007 | McCord | |
| 7,571,937 B2 * | 8/2009 | Patel | 285/92 |
| 7,600,789 B2 | 10/2009 | Vyse et al. | |
| 7,922,217 B2 | 4/2011 | Williams et al. | |
| 2007/0164566 A1 * | 7/2007 | Patel | 285/386 |
| 2007/0614566 | 7/2007 | Patel | |

FOREIGN PATENT DOCUMENTS

WO    WO2011062847 A1    5/2011

* cited by examiner

*Primary Examiner* — David E Bochna
(74) *Attorney, Agent, or Firm* — Kinney & Lange, P.A.

(57) ABSTRACT

A ferrule for use with a nut with an internal locking mechanism includes a first tubular portion with a first end and a first outer diameter for connecting to a first object; a second tubular portion with a second end and a second outer diameter for connecting to a second object; a transition portion connecting the first tubular portion and the second tubular portion; and a plurality of pockets spaced circumferentially around the second portion to engage the internal locking mechanism of the nut.

20 Claims, 2 Drawing Sheets

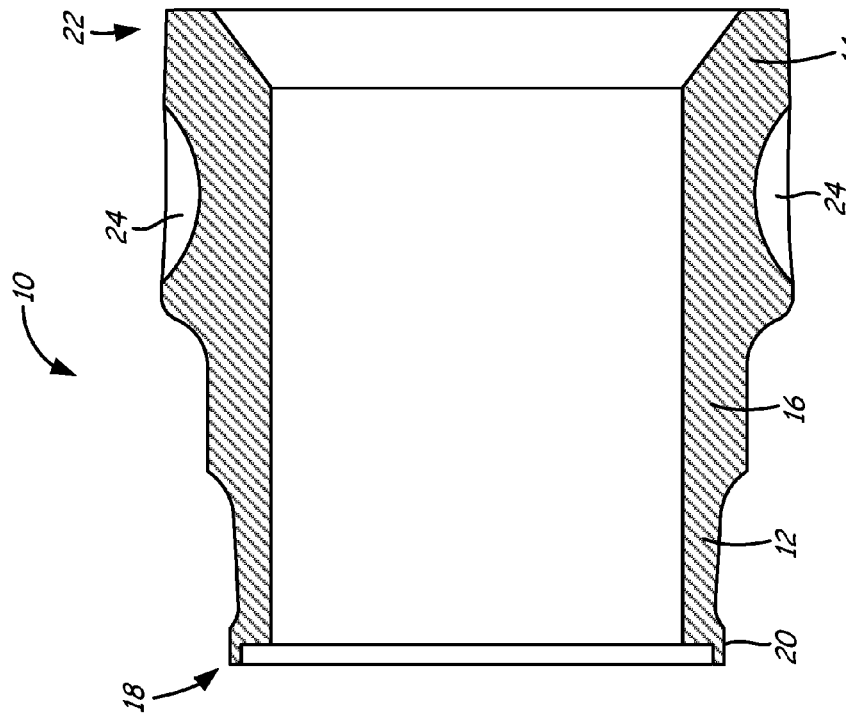
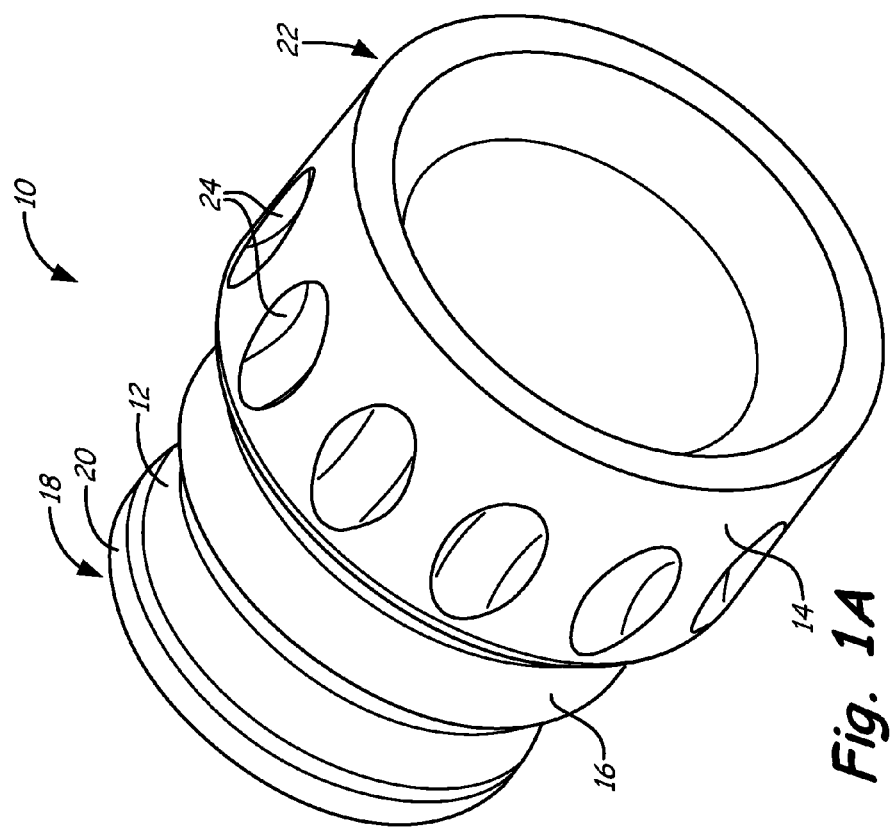

FERRULE

BACKGROUND

The present invention relates to tube fittings, and in particular, to a ferrule for tube fittings.

A ferrule typically refers an object used for fastening or joining other objects, such as two tubes. Ferrules used for joining tubes are commonly made of metal and are engaged by a locking mechanism, such as a nut. When ferrules join two tubes, one tube mechanically attaches to an end of the ferrule and the other tube usually requires a coupling device to secure to the other end of the ferrule. Ferrules used in aerospace applications also typically require a locking feature to ensure the locking mechanism stays engaged to the ferrule and does not unintentionally loosen (due to vibrations, wear or other causes). The locking mechanism can be lockwire. Lockwire is braided wire that can connect to the ferrule, the nut and/or to another object to ensure that connections stay engaged. An alternative type of locking mechanism includes a nut engaging a coupling device.

SUMMARY

A ferrule for use with a nut with an internal locking mechanism includes a first tubular portion with a first end and a first outer diameter for connecting to a first object; a second tubular portion with a second end and a second outer diameter for connecting to a second object; a transition portion connecting the first tubular portion and the second tubular portion; and a plurality of pockets spaced circumferentially around the second portion to engage the internal locking mechanism of the nut.

A method of assembling a fitting for use with a nut with an internal locking mechanism and a fastening means includes connecting a first tube to a ferrule; connecting a second tube to a coupling member; connecting the coupling member to the second portion of the ferrule; and connecting the nut over the ferrule and coupling member such that the internal engagement mechanism of the nut engages the plurality of pockets of the ferrule, and the fastening means of the nut engages the fastening means of the coupling to lock the ferrule with the first tube to the coupling with the second tube. The ferrule includes a first tubular portion with a first end and a first outer diameter for connecting to a first object, a second tubular portion with a second end and a second outer diameter for connecting to a second object, a plurality of pockets spaced circumferentially around the second end portion to engage the internal locking mechanism of the nut, and a transition portion connecting the first portion to the second portion.

BRIEF DESCRIPTION OF THE DRAWINGS

FIG. 1A is a perspective view of a ferrule.
FIG. 1B is a cross-sectional view of the ferrule of FIG. 1A.

DETAILED DESCRIPTION

Figure 2A:
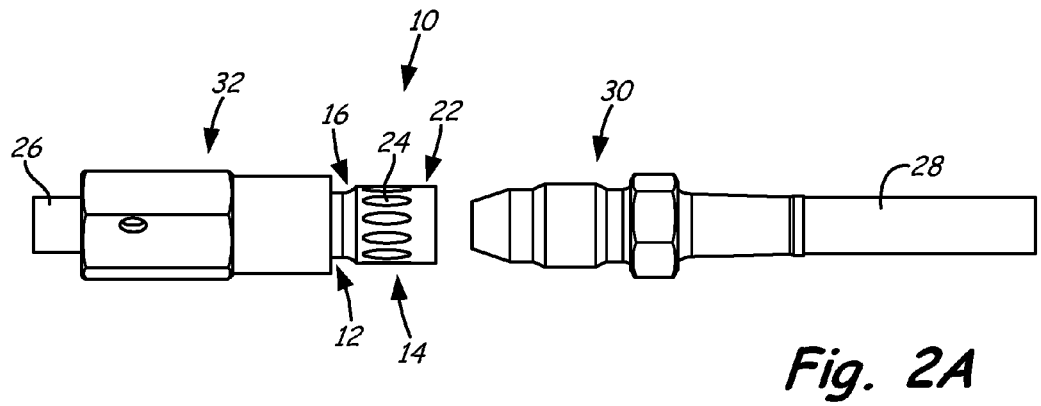
FIG. 2A is a perspective view of a first and second tube and a fitting with a ferrule.

FIG. 1A is a perspective view of ferrule 10. FIG. 1B is a cross-sectional view of ferrule 10. Ferrule 10 includes first tubular portion 12, second tubular portion 14 and transition portion 16. First portion 12 includes first end 18 with lip 20 and includes a first taper from transition portion 16 to first end 20. Second portion 14 includes second end 22 and a plurality of pockets 24 equally spaced circumferentially around second portion 14. Pockets 24 are located closer to transition portion 16 than to second end 22. Second portion 14 can have a second taper from transition portion 16 to second end 22. Transition portion 16 can be a tubular portion with rounded shelves or lips to transition from first portion 12 with a smaller diameter to second portion 14 with a larger diameter.

Ferrule 10 can be made of stainless steels, nickel (including alloys), titanium (including alloys) or other metals depending on requirements. Ferrule 10 can be made by machining, forging, casting or other methods depending on materials used and ferrule specifications.

In the embodiment of ferrule 10 shown in FIGS. 1A-1B, first portion 12 includes a first taper of about four degrees. Second portion 14 includes a second taper from transition portion 16 to second end 22 of about one degree. Pockets 24 have a depth of about 0.40 inches (1.016 mm) to about 0.050 inches (1.27 mm). Specific dimensions are given for example purposes only, and can vary depending on system requirements.

Pockets 24 are formed around circumference of second portion 14 so they are not affected by a welded connection of a tube to first end 20. Additionally, pockets 24 are located in second portion 14 due to the larger diameter of second portion 14, leaving more volume available for pockets 24 and keeping pockets 24 in the strongest portion of ferrule 10. Pockets 24 are located a distance from end 22 of second portion 14 to lessen stress levels in second end 22. Size, shape, amount and placement of pockets are dependent on system requirements and can vary. For example, pockets can be larger or smaller than pockets shown. Additionally, alternative embodiments of ferrule 10 can include fewer or more pockets.

Figure 2B:
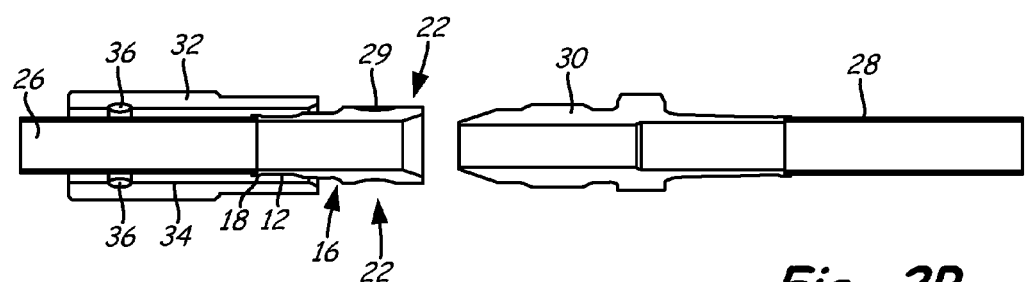
FIG. 2B is a cross sectional view of FIG. 2A.
Figure 2C:
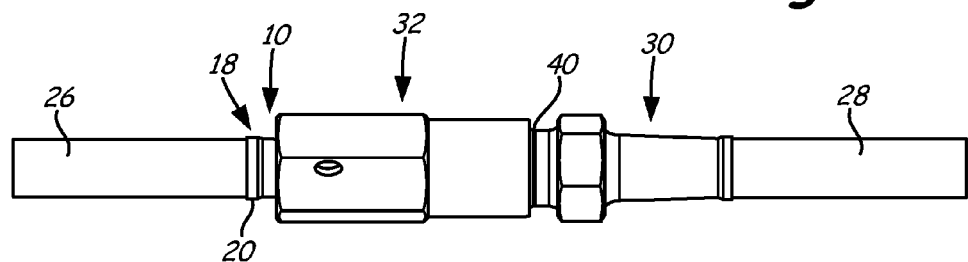
FIG. 2C is a perspective view of the first and second tubes of FIG. 2A joined by the fitting with ferrule.
Figure 2D:
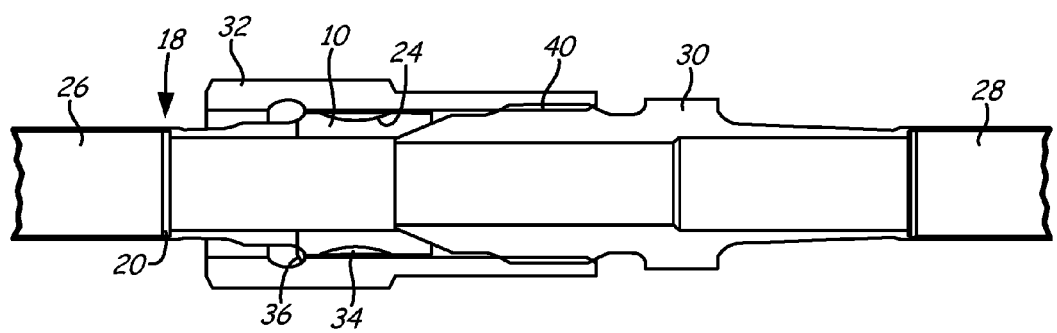
FIG. 2D is a cross-sectional view of FIG. 2C.

FIG. 2A is a perspective view of a first and second tube to be joined together with ferrule 10. FIG. 2B is a cross sectional view of FIG. 2A. FIG. 2C is a perspective view of the first and second tubes of FIG. 2A joined together, and FIG. 2D is a cross-sectional view of FIG. 2C. FIGS. 2A-2D include ferrule 10 (with first portion 12, second portion 14, transition portion 16, first end 18, first end lip 20, second end 22, plurality of pockets 24) first tube 26, second tube 28, coupling member 30 and nut 32 with engagement mechanism 34 and thrust wire 36. Engagement mechanism 34 can be a spring loaded part or any other part that can engage pockets 24 to secure ferrule 10 to coupling member 30.

First tube 26 connects to lip 20 of first end 18 of ferrule 10. First tube 26 can be welded into lip 20 of first end 18. Alternative first tube 26 can be brazed or inertia bonded to lip 20 of first end 18. Second tube 28 connects to coupling member 30. This can be a welded, brazed or bonded connection. Nut 32 fits around first tube 26, with ferrule 10 mostly still exposed when tubes 26, 28 are not yet connected together (FIGS. 2A-2B).

As seen in FIGS. 2C-2D, first tube 26 and second tube 28 are joined by connecting coupling member 30 to second end 22 of ferrule 10. Nut 32 slides toward coupling member 30 to connect to ferrule 10 and coupling 30. Nut 32 connects to ferrule through engagement mechanism 34 engaging pockets 24 of ferrule 10 and through thrust wire 36. Thrust wire 36 connects to ferrule 10 near transition portion 16 on first portion 12 of ferrule 10 and works to ensure nut 32 does not slip over transition portion 16 of ferrule. Nut 32 connects to coupling member 30 through threaded connection 40.

When first tube 26 is connected to second tube 28 through coupling member 30 and ferrule 10, nut 32 holds coupling member 30 and ferrule 10 together through threads 40. Engagement mechanism 34 engages pockets 24 of ferrule 10 to provide anti-rotation force to nut 32, ensuring that nut 32 stays securely connected through threads 40 and does not loosen or back off. This ensures that first tube 26 stays securely connected to second tube 28.

Through the use of ferrule 10 with first portion 12, second portion 14, transition portion 16 and pockets 24 for engagement with engagement mechanism 34 of nut 32, ferrule 10 securely joins tubes 26, 28 without requiring the lockwire which prior ferrules often needed. As mentioned, prior art ferrules typically required lockwire to secure the nut and ensure that it did not loosen or back out. The lockwire was attached to the outside of the nut and to another object (coupling member, tube, etc.). This created a system that needed more space and left the lockwire exposed and in danger of breaking. A break in one or more of the braids of the lockwire could pose a safety hazard as well as leave the tube in danger of disengaging. Additionally, the production of lockwire is costly, due to the need to braid the wires to add strength. The current system eliminates the need to use lockwire by placing a plurality of pockets 24 around the circumference of ferrule 10 to be engaged by internal engagement mechanism 34 of nut 32. This internal engagement provides the anti-rotation force to ensure nut 32 does not loosen while eliminating the need for expensive and sometimes hazardous systems using lockwire.

To allow for a smooth retraction of nut 32 from ferrule 10, pockets 24 can have a gradual transition. This smooth, gradual transition reduces the amount of force required to pull engagement mechanism 34 from pockets 24, allowing for easier disassembly of tubes.

Additionally, by forming engagement mechanism internally, ferrule 10 can have a similar (if not identical) envelope to prior art ferrules. This allows ferrule 10 to be able to accommodate current tubes (and coupling members) in use, needing to replace the ferrule and nut in the system with ferrule 10 and nut 32. Forming ferrule 10 with a plurality of pockets 24 for engagement also allows for ferrule 10 to be used with a variety of different nuts so long as the nut includes a means for engaging pockets 24.

While the invention has been described in reference to using a nut with an internal locking mechanism with ferrule 10, this is for example purposes only and other types of engagement mechanisms can be used.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ferrule for use with a nut with an internal locking mechanism, the ferrule comprising:
   a first tubular portion with a first end and a first outer diameter for connecting to a first object;
   a second tubular portion with a second end and a second outer diameter for connecting to a second object;
   a transition portion connecting the first tubular portion and the second tubular portion; and
   a plurality of pockets spaced circumferentially around the second tubular portion to engage the internal locking mechanism of the nut, wherein each of the plurality of pockets extends radially into the second tubular portion and has a perimeter on all sides of each of the plurality of pockets at the second outer diameter.

2. The ferrule of claim 1, wherein the first tubular portion includes a first taper around the outer circumference.

3. The ferrule of claim 2, wherein the first taper is about four degrees.

4. The ferrule of claim 1, wherein the second portion includes a taper around the outer circumference.

5. The ferrule of claim 4, wherein the taper on the second tubular portion is approximately one degree.

6. The ferrule of claim 1, wherein the ferrule is made of stainless steels, nickel or titanium.

7. The ferrule of claim 6, wherein the plurality of pockets are spaced closer to the transition portion than to the second end.

8. The ferrule of claim 6, wherein a thrust wire from the nut connects to the ferrule near the transition portion.

9. The ferrule of claim 1, wherein the second outer diameter is larger than the first outer diameter.

10. The ferrule of claim 1, wherein the transition from first tubular portion to second tubular portion comprises a third tubular portion with a shelf adjacent to each of the first tubular portion and the second tubular portion.

11. The ferrule of claim 1, wherein the pockets are equally spaced circumferentially around the second tubular portion.

12. A fitting for joining a first tube and a second tube, the fitting comprising:
    a coupling member to connect to the second tube;
    a nut with an internal locking mechanism; and
    a ferrule to connect to the first tube and to the coupling member, the ferrule comprising:
      a first tubular portion with a first end for connecting to the first tube;
      a second tubular portion with a second end for connecting to the second tube;
      a transition portion around the outer circumference to connect the first tubular portion to the second tubular portion; and
      a plurality of pockets spaced circumferentially around the second tubular portion to engage the internal locking mechanism of the nut, wherein the pockets extend radially inward from the outer circumference of the second tubular portion and are surrounded by the outer circumference of the second tubular portion.

13. The fitting of claim 12, wherein the first tubular portion of the ferrule includes a first taper.

14. The fitting of claim 13, wherein the first taper is about four degrees.

15. The fitting of claim 12, wherein the second tubular portion of the ferrule includes a taper.

16. The fitting of claim 12, wherein the plurality of pockets on the ferrule are located closer to the transition portion than to the second end.

17. A method of assembling a fitting for use with a nut with an internal locking mechanism and a fastening means, the method comprising:
    connecting a first tube to a ferrule, the ferrule comprising:
      a first tubular portion with a first end and a first outer diameter for connecting to a first object,
      a second tubular portion with a second end and a second outer diameter for connecting to a second object,
      a plurality of pockets spaced circumferentially around the second tubular portion and extending into the second tubular portion to engage the internal locking mechanism of the nut, each of the plurality of pockets with an outer perimeter on all sides of each of the plurality of pockets at the second outer diameter, and a transition portion connecting the first tubular portion to the second tubular portion, wherein the first outer diameter is smaller than the second outer diameter;

connecting a second tube to a coupling member with a fastening means;

connecting the coupling member to the second tubular portion of the ferrule;

connecting the nut over the ferrule and coupling member so that the internal locking mechanism of the nut engages the plurality of pockets of the ferrule and the fastening means of the nut engages the fastening means of the coupling to lock the ferrule with the first tube to the coupling with the second tube.

18. The method of claim 17, wherein the first tube is connected to the ferrule by welding, brazing or bonding.

19. The method of claim 17, wherein the second tube is connected to the coupling member by welding, brazing or bonding.

20. The method of claim 17, wherein the fastening means are threads.

* * * * *